(No Model.)

F. F. HUNT.
APPARATUS FOR AGITATING SOLUTIONS IN THE LEACHING OF METALS FROM THEIR ORES.

No. 370,871. Patented Oct. 4, 1887.

UNITED STATES PATENT OFFICE.

FREDERICK F. HUNT, OF NEW BRIGHTON, NEW YORK.

APPARATUS FOR AGITATING SOLUTIONS IN THE LEACHING OF METALS FROM THEIR ORES.

SPECIFICATION forming part of Letters Patent No. 370,871, dated October 4, 1887.

Application filed July 2, 1886. Serial No. 206,927. (No model.)

*To all whom it may concern:*

Be it known that I, FREDERICK F. HUNT, a subject of the Queen of Great Britain, and a resident of New Brighton, in the county of Richmond and State of New York, have invented certain new and useful Improvements in Apparatus for Agitating Solutions in the Leaching of Metals from their Ores, of which the following is a specification.

My invention relates to an improvement in apparatus for agitating the acid solutions formed in the leaching of copper and other ores; and the object of the same is to provide a form of rotary agitator in which the heavier portions of the charge cannot accumulate at the center of the apparatus and escape the action of the agitating-arms, which will also produce a more perfect agitation of the solutions than has heretofore been possible, and which will be more durable and economical to construct than the forms in present use.

Heretofore the agitators used in leaching-works have usually been made with flat bottoms, and have been provided with stirring or agitating arms of conical shape at the base, arranged to rotate a slight distance above the bottom. In my invention this arrangement is reversed, and the agitating-tank is constructed with a cone of small altitude placed apex upward in the center of the bottom and covering a considerable portion thereof, and is provided with agitators, the arms of which are provided with concave shoes and are arranged to rotate in close proximity to the cone in the bottom of the tank.

The invention will be best understood by reference to the accompanying drawings, forming a part of this specification, in which—

Figure 1:
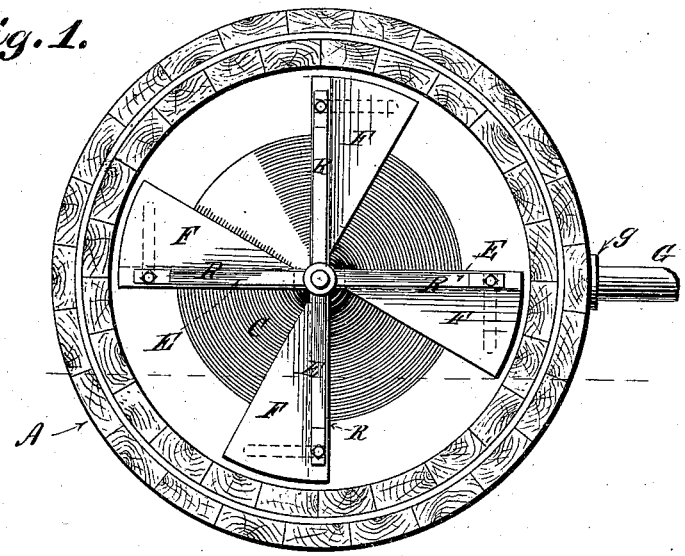
Figure 2:
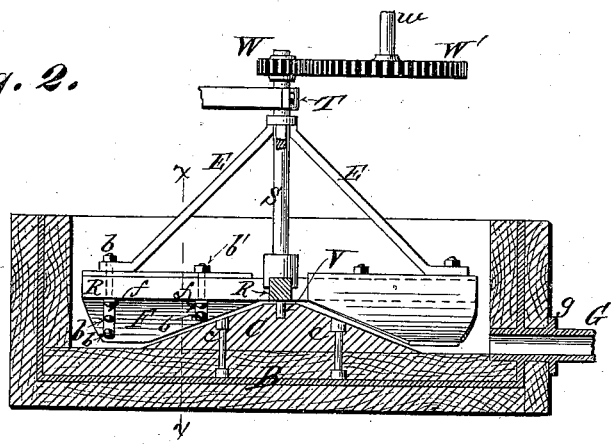
Figure 3:
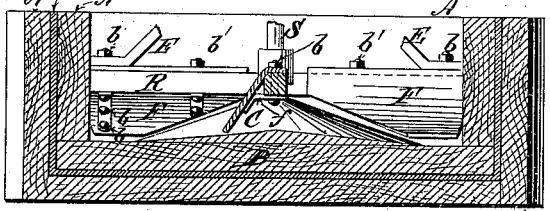

Figure 1 is a plan view of the apparatus; Fig. 2, a vertical section of the same, and Fig. 3 a vertical section upon the line *x x* of Fig. 2.

Similar letters refer to similar parts throughout the several views.

In the drawings, A represents the agitator-tank, which is composed of any convenient material and is of any desired dimensions or shape. In practice it will be found most convenient to make the agitator-tank circular, constructing it of two layers of wooden planks of suitable thickness—an outer layer, A', and an inner layer, A$^2$, having between them a layer of sheet lead or copper, A$^3$, of any convenient thickness. The tank A may rest upon any convenient form of wooden or stone foundation.

In the views, B represents the bottom of the tank, constructed in the same manner; and C, a wooden or copper cone of convenient height. The cone C is made of copper or wood, and is constructed in a separate piece from the bottom of the agitator, in order that it may be replaced from time to time as it becomes worn away, and is attached thereto by means of the wooden pegs *c c*. In the drawings the cone only covers a portion of the bottom, it being placed in the center, a certain annular flat portion being left around it. Cone C is made of such height that the inclination of its sides shall be very gradual. Its diameter is such that it covers only about one-half or two-thirds of the bottom of the tank, leaving a flat path for the flat portion of the agitator-arms between the edge of the cone and the sides of the tank. The apex of the cone C is flattened, as shown in the views, and has in it a bearing, V, for the agitator-shaft, which carries any number of rotating agitating-arms R R R R, but preferably four, as shown in the views. The shaft of the agitator S is made of wood or metal. The upper end of the shaft rotates in the bearing T, which may be of any construction, and carries the pinion-wheel W, gearing into the wheel W' on the rotating shaft *w*, whence motion is imparted to the shaft S. The lower extremity of the shaft S rotates upon the bearing V in the cone C, a pin or step, V', being inserted in the junction of the arms directly under the shaft. The radial arms of the agitator R R R R are made of wood or iron, and are preferably flat on top. They are mortised together, as shown in the views, and the collar S', into which the extremity of the shaft fits, is placed over them to hold them in position, and they are supported by the tie-rods E, of iron or wood, bolted or otherwise attached to the shaft and arms. The arms R R carry each a beveled copper shoe, F, inclined at an angle of thirty degrees to the top of the radial arms, which rotate upon and with the arms in close proximity to the cone C in the bottom of the tank. The shoes F F are so beveled at their inner extremities as to correspond with the inclination of the convex surface of the cone, and are made of copper or other metal not affected by the acids in the tank, of any convenient thickness, and are attached to the radial arms in any convenient manner, preferably, however, by the brackets $f f$, as shown in the views, the bolts $b b$ passing through the shoes and the bolts $b' b'$ through the radial arms R R R. By so beveling the shoes of the agitator-arms and using them in connection with the cone C the heavy particles of the charge, which naturally tend to accumulate in the center of the tank, are thrown upward and into the current produced by the flat portion of the shoes, which rotate over the flat path on the bottom of the tank, and a very perfect agitation of all portions of the charge is effected by reason of the varying direction of the currents so produced.

I am aware that agitators have been constructed with cones placed bottom upward in the tank or tub to prevent the accumulation of larger particles in the center of the tank, and with shoes of various materials arranged that they shall fit the inclined surfaces of the cone. I am not aware, however, that agitators have ever been constructed with a cone in the bottom so arranged that it can be removed and replaced at pleasure when it becomes worn away without tearing the agitator to pieces. I am unaware, however, that agitators have been constructed either with cones upon the bottom in their interior or with rotating arms provided with shoes so beveled as to correspond with the inclination of the sides of the cone upon the bottom, where the cone covers only a portion of the bottom, and can be removed and replaced when necessary; hence

I claim as my invention—

The combination, substantially as hereinbefore set forth, in an agitating-tank, of a cone placed with its apex upward in the center of the bottom of the same and covering the greater portion thereof, arranged so that it may be removed and renewed at pleasure, one or more horizontally-rotating agitating-arms rotating upon a bearing on the apex of said cone, carrying inclined shoes made of metal beveled on the edges to correspond to the inclination of the sides of said cone, and rotating over and in close proximity to the bottom of the tank, and means for rotating said shoes, substantially as described.

Signed at New York, in the county of New York and State of New York, this 29th day of June, A. D. 1886.

FREDERICK F. HUNT.

Witnesses:
WILLARD PARKER BUTLER,
EDWIN T. RICE, Jr.